United States Patent [19]

Crayford et al.

[11] Patent Number: 5,581,559
[45] Date of Patent: Dec. 3, 1996

[54] INVERSE PACKET DISRUPT FOR SECURE NETWORKS

[75] Inventors: Ian S. Crayford, San Jose; William Lo, Santa Clara, both of Calif.

[73] Assignee: Advanced Micro Devices, Inc., Sunnyvale, Calif.

[21] Appl. No.: 406,082

[22] Filed: Mar. 17, 1995

[51] Int. Cl.⁶ ................................ H04J 3/26; H04B 3/36
[52] U.S. Cl. .................... 370/392; 370/402; 370/501; 395/186
[58] Field of Search ................. 370/83, 60, 60.1, 370/94.1, 94.2, 94.3, 85.1, 85.6, 85.5, 85.2, 85.3, 85.9, 85.8, 85.13, 85.14, 85.15, 92, 93, 97, 13.1, 75, 125, 35, 80; 455/11.1, 7, 13.1, 16; 375/211, 225, 212; 371/20.2; 340/825.07, 825.4, 825.05, 825.5, 825.51, 825.52, 825.04, 825.03, 825.02, 825.08; 380/3, 4, 25, 23, 29, 49, 50; 395/200.05, 200.08, 200.16, 124, 185; 379/4

[56] References Cited

U.S. PATENT DOCUMENTS

| 5,136,580 | 8/1992 | Videlock et al. | 370/85.13 |
|---|---|---|---|
| 5,265,123 | 11/1993 | Vijeh et al. | 375/211 |
| 5,337,309 | 8/1994 | Faulk, Jr. | 370/85.13 |
| 5,353,353 | 10/1994 | Vijeh et al. | 380/29 |
| 5,394,402 | 2/1995 | Ross | 370/85.13 |
| 5,414,694 | 5/1995 | Crayford et al. | 370/13.1 |
| 5,436,617 | 7/1995 | Adams et al. | 340/825.4 |

*Primary Examiner*—Douglas W. Olms
*Assistant Examiner*—Dang Ton
*Attorney, Agent, or Firm*—Benman Collins & Sawyer

[57] ABSTRACT

A method for providing a secure local area network includes the steps of receiving a data packet having a destination address and comparing the destination address to stored end station addresses. The data packet is disrupted on the repeater for the ports except the port with an associated stored end station address matching the destination address. Also, the disrupting of the data packet can be enabled on an individual port basis. A system includes a controller, a memory/comparator, and an inverse disrupt control mechanism. The inverse disrupt control mechanism produces a disrupt signal to disrupt the data packet on non-matching ports of the repeater when a match occurs within the repeater. The data packet is not disrupted on a port linking two repeaters when there is no match within the repeater. The inverse disrupt control can also be enabled or disabled on an individual port basis.

14 Claims, 6 Drawing Sheets

INVERSE PACKET DISRUPT FOR SECURE NETWORKS

FIELD OF THE INVENTION

The present invention relates generally to data security within a local area network and more particularly to packet disruption within a network that utilizes Multiport Repeaters.

CROSS REFERENCE TO RELATED APPLICATIONS

"Expandable Repeater" (Vijeh, Staab), U.S. Pat. No. 5,265,123.

"Address Tracking over Repeater Based Networks" (Crayford, Vijeh, Lo), U.S. Patent application Ser. No. 08/019,926 filed Feb. 19, 1993 now U.S. Pat. No. 5,414,694.

"Repeater Security System" (Vijeh, Lo), U.S. Pat. No. 5,353,353 issued Oct. 4, 1994.

"Programmable Address Mapping Matrix for Secure Networks" (Lo, Crayford), U.S. Patent application Ser. No. 08/366,809 filed Dec. 30, 1994.

"Programmable Delay of Disrupt for Secure Networks" (Lo, Crayford), U.S. Patent application Ser. No. 08/366,808 filed Dec. 30, 1994.

"Programmable Disrupt of Multicast Packets for Secure Networks" (Lo, Crayford), U.S. Patent application Ser. No. 08/366,806 filed Dec. 30, 1994 now U.S. Pat. No. 5,539,737.

"Multiple Address Security Architecture" (Lo, Crayford), Ser. No. 08/460,319 filed on Jun. 2, 1995.

"Intrusion Control in Repeater Based Networks" (Lo, Crayford), U.S. Ser. No. 08/405,686, filed on even date herewith.

BACKGROUND OF THE INVENTION

In traditional Ethernet (802.3 10BASE5) and Cheapernet (802.3 10BASE2) a coaxial cable provides the linear bus to which all nodes are connected. Signalling is achieved using a current sink technique with a center conductor used for the signal and a shield used as a ground reference. All devices are connected to the coaxial bus, and therefore all devices will receive the transmission of a single device. Twisted pair Ethernet (802.3 10BASE-T) utilizes standard voice grade telephone cable, employing differential signalling on separate transmit and receive pairs of the cables. 10BASE-T provides only a point-to-point communication capability and requires additional active elements, e.g., a repeater, to provide a point-to-multipoint local area network (LAN) capability. An Ethernet network system typically includes a number of interconnected cable segments. A repeater is used to interconnect two or more cable segments. Each cable segment may be one of a variety of cable types, for example, coaxial or twisted pair. The repeater performs signal amplitude and timing restoration on an incoming bitstream and repeats the bitstream to all of the ports connected to the repeater. By repeating data to all ports, the repeater acts as a logical coaxial cable so that any node connected to the network will see another node's transmission.

Traditionally, repeaters allow wired coaxial Ethernet to extend a network's physical distance limit. For twisted pair Ethernet, if more than two nodes are required to provide connectivity, the IEEE 802.3 10BASE-T Standard mandates the use of a repeater. Although the physical signalling on the coaxial and twisted pair cabling differs, the functionality of the repeater for either is identical as is the frame or packet format used to pass messages through the repeater between the participating nodes on the network.

FIGS. 1 and 2 show the format for an IEEE 802.3 Standard compliant packet and an Ethernet packet, respectively. The packet commences with a preamble sequence which is an alternating (1,0) pattern. The preamble provides a single frequency on the network, in this case 5 Mega Hertz (MHz) at the start of each frame, which allows a receiver to lock to the incoming bitstream. The preamble sequence is then followed by a start of frame indicating that the data portion of the message will follow. Either a start of frame delimiter (802.3) or synch sequence (Ethernet) is used to delineate the start of the data portion of the message. A primary difference as shown is the start of frame delimiter (SFD). For 802.3, the SFD is defined as a byte that has a "1,0, 1,0, 1,0, 1,1" pattern whereas the start frame (synch) of Ethernet is a "1,1" sequence. However, in both cases the preamble plus the start of frame indication is a total of 64 bits long.

Regarding packet size, both 802.3 and Ethernet standards specify that a packet must be in the range of 64–1518 bytes. However, the actual data field in the 802.3 system is permitted to be smaller than the 46 byte value that ensures a minimum packet size. The Media Access Control sub-layer appends pad characters to a Logical Link Control (LLC) data field before sending data over the network to compensate for a smaller data field. The Ethernet standard assumes that the upper layer ensures that the minimum data field is 46 bytes before passing data to a Media Access Control (MAC) sublayer and the existence of these appended characters is unknown to the MAC device.

The 802.3 standard also uses a length field which indicates the number of data bytes that are in the LLC data and pad fields only. The high order byte of the length field is transmitted first with the least significant bit (LSB) of each byte transmitted first. Ethernet, on the other hand, uses a type field in the same two bytes of the frame to identify the message protocol type.

The data field contains the actual packet data that is being transferred and is between 46 to 1500 bytes in length. Since valid Ethernet type fields are always assigned outside of the valid maximum 802.3 packet length size, both 802.3 and Ethernet packets can coexist on the same network.

The LLC function fragments data into block sizes suitable for transmission over the network. Data bytes are transmitted sequentially with the LSB of each byte transmitted first. Following the LLC data/pad fields, the frame check sequence (FCS) is a four-byte field that contains the cyclic redundancy check (CRC) for the entire frame. The CRC is computed by the transmitting station on the destination address, source address, length/type, and data field and is appended as the last four bytes of the frame. The same CRC algorithm is used by the receiving station to compute the CRC value for the frame as it is received. The value computed at the receiver is compared with the value appended by the transmit station to provide an error detection mechanism for corrupted data. The CRC bits within the FCS are transmitted in the order most significant bit to least significant bit.

Two other fields of the frame are the destination address (DA) and the source address (SA) for the frame. Both addresses are 48 bit values transmitted LSB first. A receiving MAC determines if a match exists between the receiver's node address and the address within the DA field. Only a node indicated as matching should attempt to receive the remainder of the packet.

Three types of destination addressing are supported by the 802.3 and Ethernet standards.

1. Individual. The DA field contains an individual and unique address assigned to one node on the network.

2. Multicast. If the first bit of the DA field is set this indicates that the group address is being used. The group of nodes that will be addressed is determined by a higher layer function but in general the intent is to transmit a message between a logically similar subset of nodes on the network.

3. Broadcast. The broadcast is a special form of multicast address where the DA field is set to all 1s. The address is reserved, and all nodes on the network must be capable of receiving a broadcast message.

The source address field is supplied by the transmitting MAC. The transmitting MAC inserts a sender's node address into the SA field as the frame is transmitted to indicate the node as the originating station of the packet. The receiving MAC is not required to take action based on the SA field.

As mentioned above, the repeater in a network repeats data to all nodes on a network. Preferably, data in a packet is only received at an end station to which the data is addressed as specified by the destination address in the destination address field of the packet. Unfortunately, without security measures, there is nothing to prevent an unauthorized end station from eavesdropping on a packet.

An attempt to stop unauthorized reception of a packet involves disrupting a packet at the repeater for all end station addresses except the end station address matching the destination address identified in the packet. Disrupting a packet typically involves transmitting random data in place of the data in the data packet to maintain proper functioning of the network. For large networks, the repeater is typically connected to another repeater or coax. In these larger networks, the repeaters must be capable of storing hundreds of addresses for each of the numerous end stations existing in the network in order for the disrupt function to perform properly. Unfortunately, large storage capabilities are impractical and expensive for most large networks.

One method of reducing storage requirements limits the number of different end station addresses that are contained in a network. A second method assumes that a direct link between repeaters is secure and disables the disrupt function for ports connecting repeaters. Unfortunately, neither of these methods is completely satisfactory. Limiting the number of end station addresses limits the ability to expand a network. Disabling the disrupt function on the link between two repeaters provides a potential security risk for an intruder on the link. Thus, a need exists for a disrupt function that does not require large storage space and maintains a more secure network. The present invention addresses these needs.

SUMMARY OF THE INVENTION

The present invention provides a method and apparatus for providing a secure local area network by controlling the disruption of a data packet on the network.

In one aspect of the present invention, a method for securing a local area network includes the steps of receiving a data packet having a destination address and comparing the destination address to at least one stored end station address. The data packet is disrupted on the repeater when there is a match between the addresses except on the port having the match. Also, the disrupting of the data packet can be enabled on an individual port basis. For a multiple repeater network, the step of comparing is performed substantially simultaneously on each repeater. The method further produces a signal indicative of the results of the comparison in a multirepeater network to control packet disruption. In a further aspect, a port linking two repeaters is disrupted when a match occurs on one of the repeaters.

A system in accordance with the present invention includes a controller, a memory/comparator, and an inverse disrupt control mechanism. The memory/comparator stores end station addresses and compares the destination address in a data packet to the end station addresses. The inverse disrupt control mechanism produces a disrupt signal to disrupt the data packet on the ports of the repeater when a match occurs except on the port having a match.

One advantage of the present invention is a reduction in the amount of memory necessary to store end station addresses. The present invention only requires storage within each repeater of the end station addresses connected to the repeater and not all of the end stations on the network. Disruption of data occurs based on a match or mismatch of the destination address with the stored addresses. A further advantage of reduced storage requirements is a reduction in cost as well as an increase in the availability of memory space for specifying specific multicast addresses and their associated port.

In addition, the present invention provides a system capable of incorporation on a network with multiple repeaters. The ability to monitor the status of a match across multiple repeaters substantially simultaneously increases the flexibility of the system for utilization in networks of varying sizes.

These and other advantage of the present invention will be readily apparent from the following discussion of the present invention.

DETAILED DESCRIPTION OF THE INVENTION

The present invention is directed toward a system for performing comparisons with node addresses connected to repeater ports. The following description is presented to enable one of ordinary skill in the art to make and use the invention and is provided in the context of a patent application and its requirements. Various modifications to the preferred embodiment and the generic principles and features described herein will be readily apparent to those skilled in the art.

The system as described allows the destination address of an incoming packet to be monitored and compared with an internally stored value. The internal value is either programmed by the user through a microprocessor interface or by simply learning and storing the internal value, i.e., an end station address, of the previous packet transmitted from the node. The end station address includes multicast addresses.

Using a destination address and stored end station addresses, the present invention determines if a match occurs between the destination address and the stored end station addresses. Consequently, the present invention provides a control circuit that can disrupt a packet to all ports except the port indicating a match. Further, the present invention allows specific multicast address storage as an end station address, and provides a scalable matching circuit for multiple repeater networks. The present invention also reduces storage requirements while providing secure transmission of data.

Figure 1:
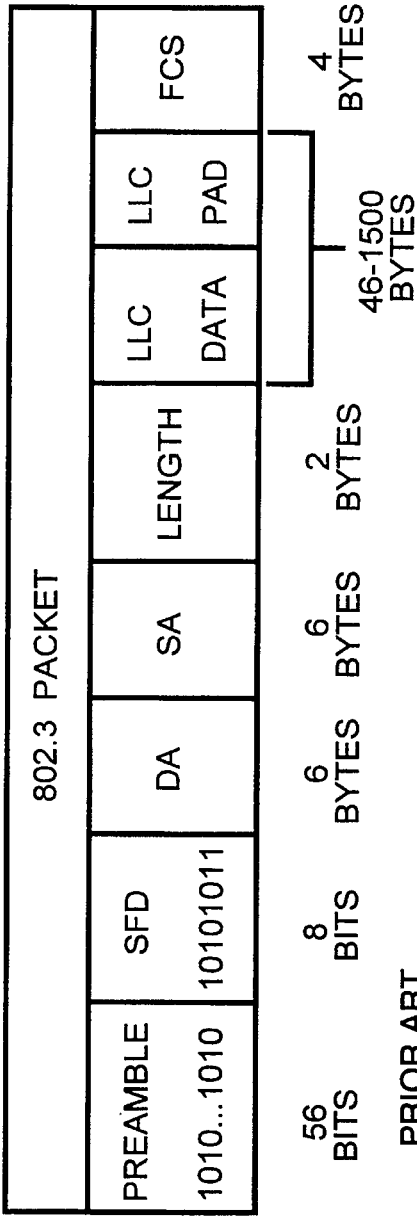
FIG. 1 shows the format for an 802.3 packet.
Figure 2:
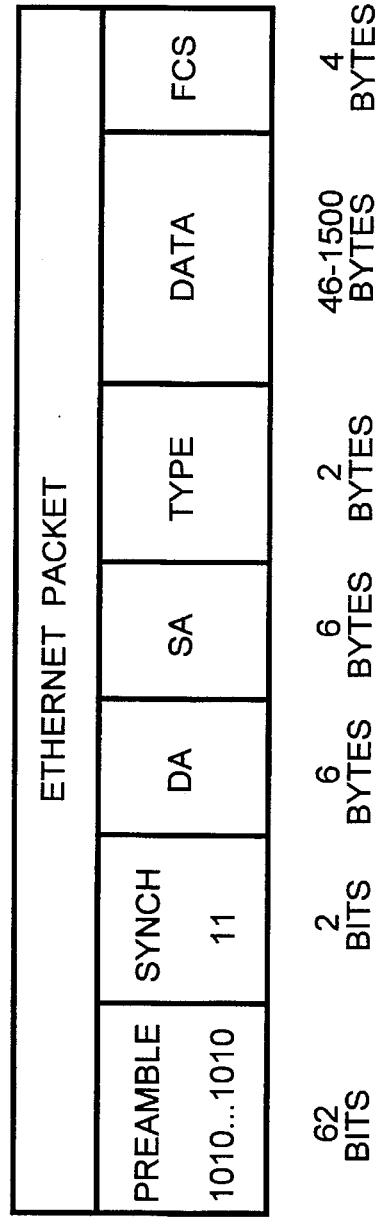
FIG. 2 shows the format for an Ethernet packet.
Figure 3:
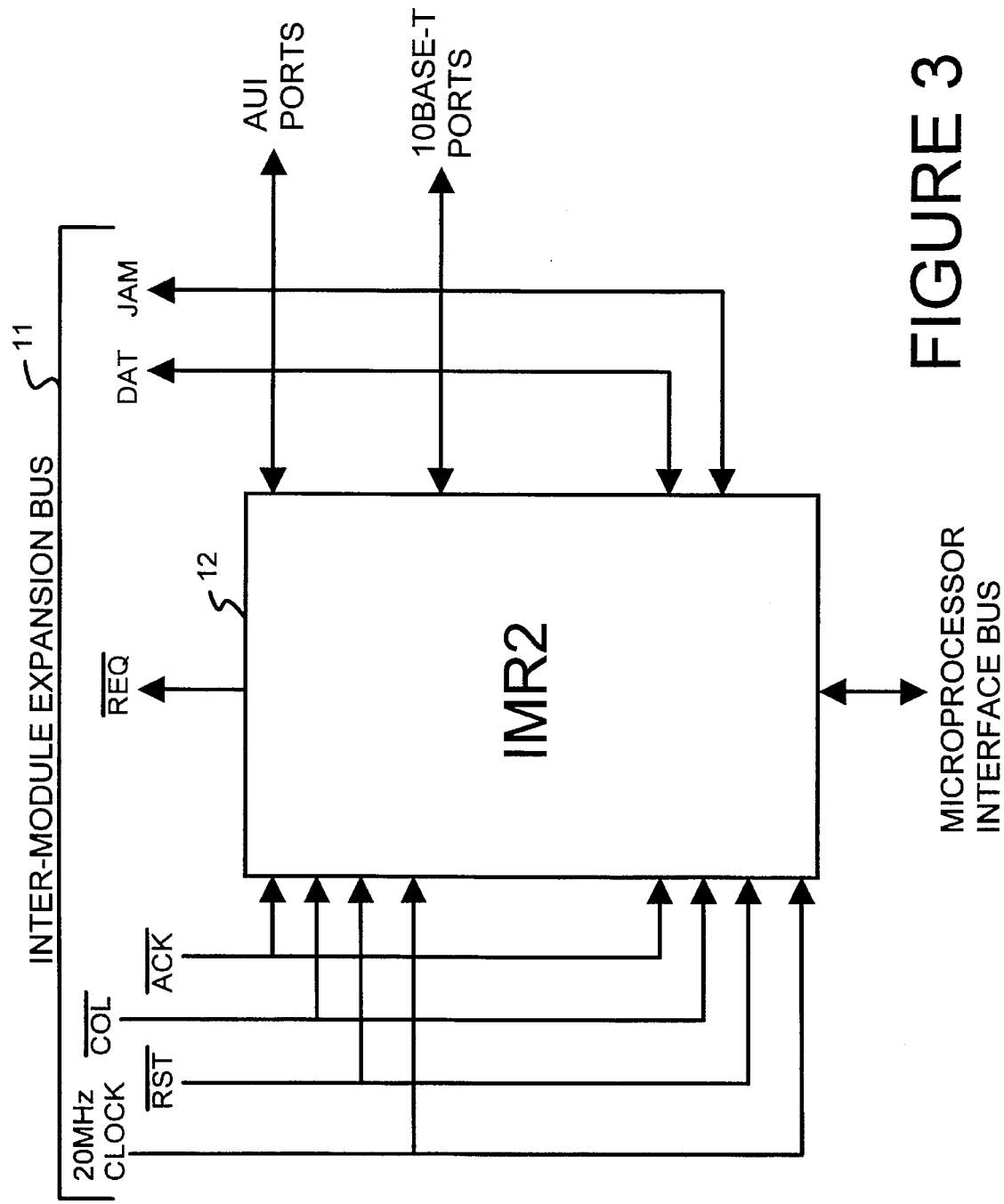
FIG. 3 is a simplified block diagram of an Integrated Multiport Repeater (IMR2) in accordance with the present invention.

Referring now to FIG. 3, the present invention comprises an Integrated Multiport Repeater (IMR2) device 12 in a preferred embodiment. The IMR2 device provides the basic repeater function, performing signal amplitude and timing restoration, incorporating individual 10BASE-T ports, and Attachment Unit Interface (AUI) ports. The 10BASE-T ports may or may not be physically integrated within the IMR2 circuit, either approach is acceptable for the preferred embodiment. The AUI ports allow connection of the 10BASE-T ports to an existing coaxial wired Ethernet/Cheapernet network. The IMR2 device also provides an inter-module expansion bus 11, which allows multiple IMR2 devices to be cascaded together, and still be treated as a single repeater.

The inter-module expansion bus 11 comprises the signals $\overline{RST}$ (Reset), 20 MHz clk (20 MHz clock), $\overline{REQ}$ (Request), $\overline{ACK}$ (Acknowledge), $\overline{COL}$ (Collision), DAT (Data) and JAM (Jam). The operation of this type of expansion scheme is described in U.S. Ser. No. 07/556,046, now U.S. Pat. No. 5,265,123 entitled Expandable Repeater and assigned to the assignee of the present application.

Note that the data passed across this expansion bus on the DAT line is a restored version of the incoming packet data received when a single port of the IMR2 device (or group of devices) is active. This means that the preamble field of the packet which is passed across the DAT pin is restored, substantially reducing or eliminating preamble shrinkage effects due to the start up delays of the receive circuits.

In addition, the IMR2 device 12 also has a management port, to allow configuration and monitoring of the operational state of the repeater.

The IMR2 12 device further provides monitoring for all network activity detected by the IMR2 device. The IMR2 12 collects statistics based on the type of network activity, and stores this information internally as registers which can be accessed by an external host device, such as a microprocessor, using the management port. The host typically uses the data collected and stored by the IMR2 12 device to provide network management information, in order to more easily administer the operation and/or fault diagnosis of the network.

The IMR2 12 provides the advantages above described. The following discussion more fully presents the operation of the device. The sizes of the various devices and signals in the following are arbitrary and one of ordinary skill in the art will recognize that many other combinations could be used and still be within the spirit and scope of the present invention. For purposes of illustration, the device sizes discussed throughout are based on an IMR2 having 16 repeater ports with each port having up to two end station addresses associated with it.

As discussed above, the present invention provides a disrupt control circuit that requires less storage space and greater security over a repeater-to-repeater link. In accordance with the present invention, a data packet is disrupted at a first port within a first repeater linked to a second repeater or coax cable when a match exists in the first repeater between the destination address and the stored end station addresses in the repeater. The first port is not disrupted if no match is found in the first repeater. An example of an arrangement that further illustrates the inverse disrupt function of the present invention is shown in FIG. 4.

Figure 4:
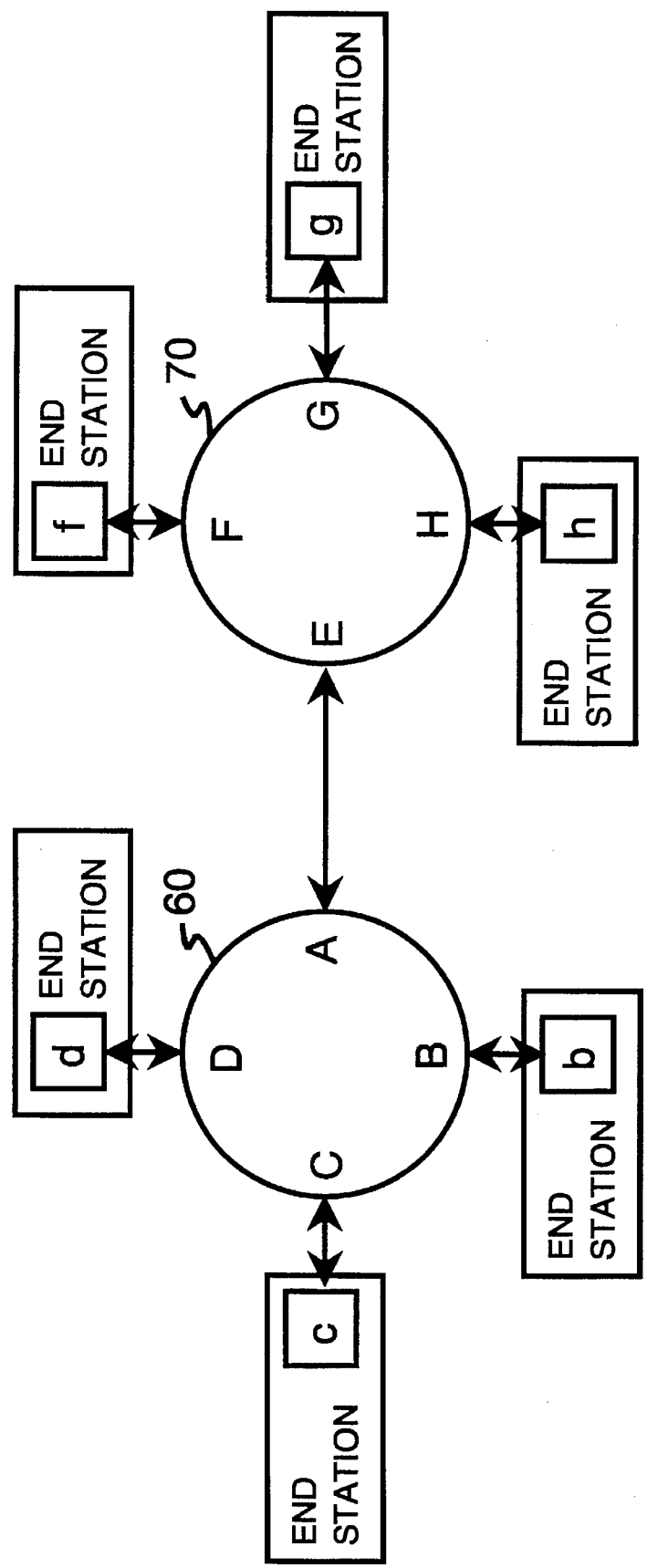
FIG. 4 is an overall view of a network having two repeaters as an example of a possible implementation of the present invention.

In FIG. 4, a first repeater 60 is linked to a second repeater 70 with port A of repeater 60 linked to port E of repeater 70. Repeater 60 further includes port B with an associated end station address of "b" port C with an end station address of "c" and port D with an end station address of "d". Repeater 70 includes port F with an end station address of "f" port G with an end station address of "g", and port H with an end station address of "h".

By way of example, a data packet is transmitted from port F to destination address "c" and control of inverse disruption is enabled for ports A and E and disabled for ports B, C, D, F, G, and H. A comparison of "c" with the end station addresses stored in repeater 70 produces no match within repeater 70. Thus, repeater 70 considers the packet destined for another end station address on another repeater. The packet is therefore not disrupted on port E but is disrupted on ports G and H. Port A receives the packet and retransmits the packet undisrupted to port C and disrupted to ports B and D. Conversely, if a data packet is transmitted from port F to a destination address "g", a match will occur in repeater 70. Thus, the repeater 70 disrupts the packet on port E in accordance with the present invention, as well as on port H, but does not disrupt the packet on port G since there was a match.

As described with this example, the addresses for the end stations in repeater 60, "d", "c", and "b" are not , stored and associated with port A in repeater 70 to control disruption of a packet between ports A and E. Rather, the present invention utilizes a comparison within a repeater to determine if any other repeater should be allowed to receive an undisrupted packet. Although FIG. 4 illustrates a repeater link having only four end station addresses per repeater, typically each repeater could have hundreds of end station addresses associated with it. Thus, by reducing the number of end station addresses being stored, the storage requirements for a system are reduced and device cost is reduced.

Figure 5:
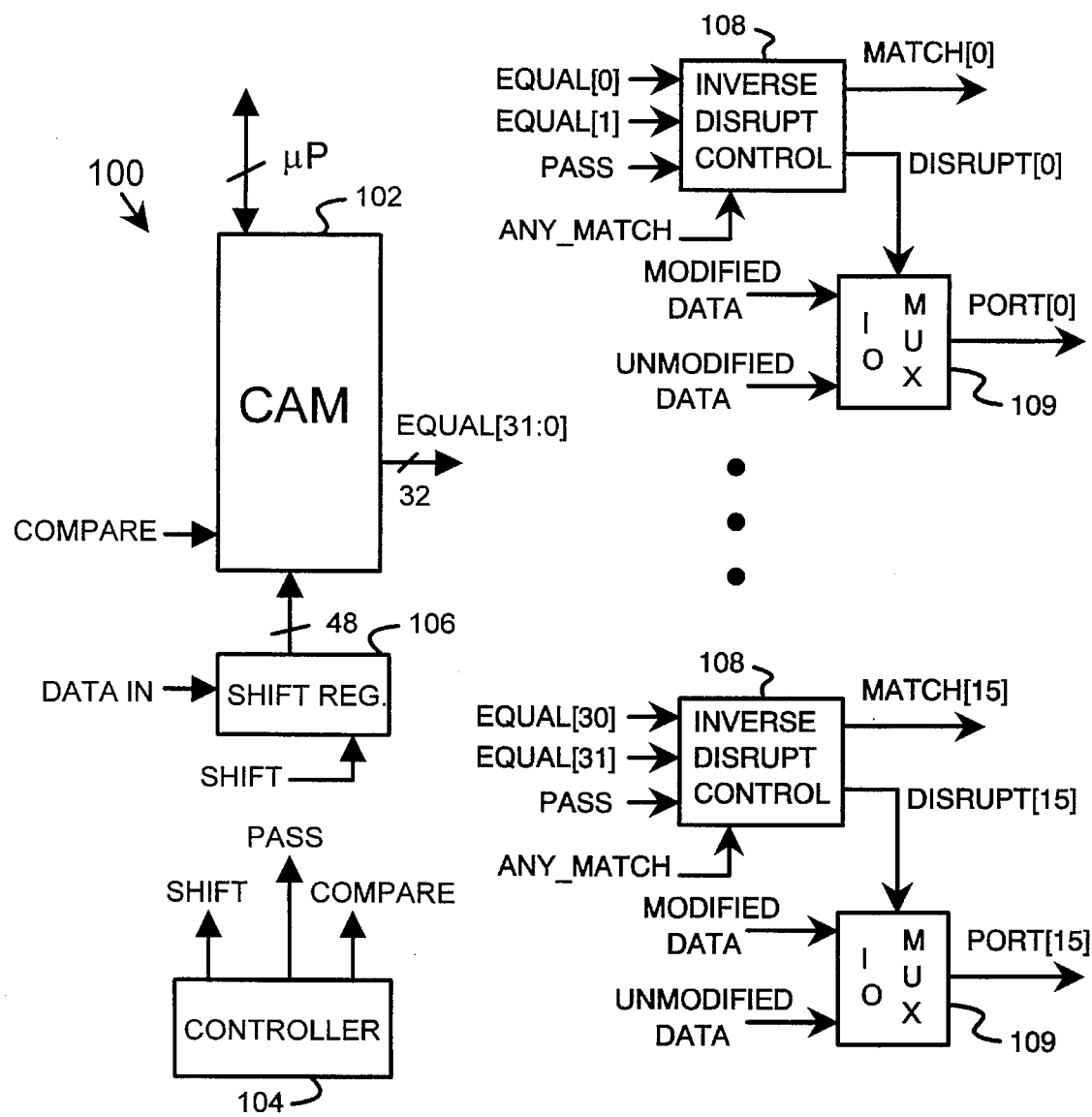
FIG. 5 is an overall block diagram of a disrupt security circuit in accordance with one embodiment of the present invention.

FIG. 5 is an overall block diagram of a disrupt security circuit 100 in the IMR2 device 12 in accordance with the present invention that provides the inverse disrupt function, such as that described in the example of FIG. 4. The circuit 100 comprises a memory comparator circuit (CAM) 102 coupled to a controller 104, a shift register 106, and inverse disrupt control circuits 108, one inverse disrupt control circuit 108 provided for each port. The CAM 102 preferably includes at least 32 storage locations, e.g., two locations for each port, with each storage location at least 48 bits wide. The CAM 102 also preferably includes a typical comparator circuit for comparing the data stored with the destination address in the shift register.

The shift register 106 receives a DATA IN signal with the destination address received in a data packet from a port. The destination address is shifted into the shift register 106 one bit at a time upon assertion of the SHIFT control signal into the shift register 106 by the controller 104. The controller 104 preferably is a control circuit or other control means capable of outputting the control signals as described herein, the details of which are individual to a particular design and well understood by those skilled in the art. When the 48 bit destination address has been fully shifted in, the controller 104 asserts a COMPARE signal into the CAM 102. The destination address in the shift register 106 is then compared in the comparator circuit with the end station addresses stored in the CAM 102, as will be well understood by those skilled in the art.

Once the comparison is completed, the CAM 102 outputs EQUAL signals. A 32 bit EQUAL signal has been found by the inventors to be suitable for a 16 port repeater having up to two end stations addresses associated with each port in accordance with the present invention. Each set of two bits in the EQUAL signal suitably represents the results of the address comparisons for each port in the repeater. For example, the lowest bit pair of the signal, bits 0 and 1, would represent the results of the address comparison for the first port, port 0. With this example, bit 0 represents the results of the comparison between a first stored address for an end station and the destination address in the packet, while bit 1 represents the results of the comparison between a second stored end station address and the destination address. The successive bit pairs in the signal would represent the results for the successive ports up to the highest bit pair, bits 30 and 31, which would represent the results for the last port, port 15, of the repeater.

Accordingly, each bit in the EQUAL signal represents a match or mismatch between the destination address in a current packet to the end station addresses stored for the port. A '1' or high bit in the EQUAL signal represents a match between the destination address and a stored address, while a '0' or low bit represents a mismatch between the addresses. The EQUAL signal is then preferably output to the inverse disrupt control circuits 108 to enable or disable the inverse disrupt function of a port in accordance with the results of the comparison.

In addition to the two bits from the EQUAL signal, the circuits 108 also preferably receive a one-bit PASS signal from the controller 104 and a signal ANY_MATCH as an indicator of a match status among all the ports, as will be described more fully with reference to FIGS. 6-9.

The inverse disrupt control circuits 108 function to output a one-bit DISRUPT signal that is passed to a multiplexor (MUX) 109 to enable or disable the operation of the inverse disrupt function for each port of the repeater by selecting the data transmitted on the PORT signal. The inverse disrupt control circuits further output a MATCH signal. The details of inverse disrupt control circuits 108 are presented in greater detail in FIG. 6, in which the (X) designation in the signal references in the circuit represents a port number, e.g. 0-15.

Figure 6:
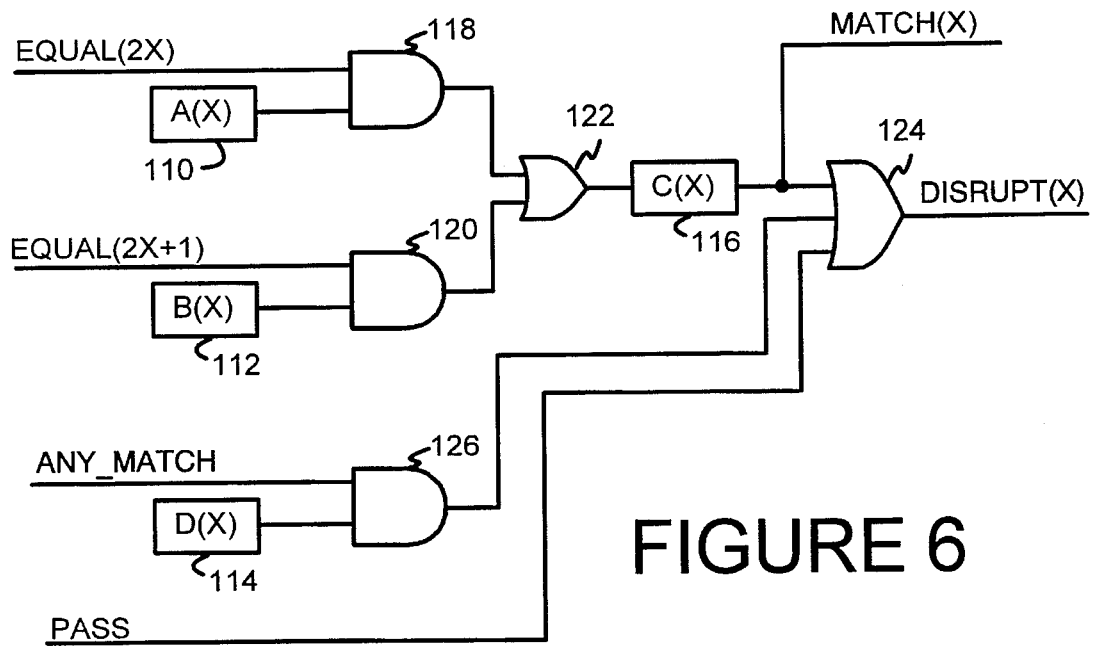
FIG. 6 is a more detailed diagram of an inverse disrupt circuit in accordance with one aspect of the present invention.

As shown in FIG. 6, the inverse disrupt control circuits 108 includes latches 110, 112, 114, and 116. Latches 110 and 112 are used to indicate CAM locations which contain valid addresses. Latches 110 and 112 latch a bit indicating whether the bits from the EQUAL signals are valid for each respective end station address for each port. For example, latch 110 latches a '1' if bit 0 of the EQUAL signal is valid for port 0, while latch 112 latches a '1' if bit 1 from the EQUAL signal is valid for port 0.

The bit latched in latch 110 is combined with a first bit from the EQUAL signal in AND gate 118. The bit latched in latch 112 is combined with a successive bit from the EQUAL signal in AND gate 120. As stated above, the bits in the EQUAL signal are high when a match has been found during the comparison of the destination address and stored end station addresses. The outputs of AND gates 118 and 120 are then input to OR gate 122. The output of OR gate 122 is then latched in latch 116 and output as the MATCH signal. The MATCH signal is also input to OR gate 124.

OR gate 124 further receives a PASS signal from controller 104. The PASS signal is preferably held high until the comparison of the addresses is completed. A high signal from PASS forces the DISRUPT signal high until the address comparison completed. Preferably, the PASS signal is brought low by the controller 104 after the completion of the address comparison until the end of the data packet is reached.

A third input into OR gate 124 is a signal resulting from a combination of an ANY_MATCH signal and a bit in latch 114 through AND gate 126. The bit latched in latch 114 indicates the enablement of the inverse disrupt function for the port, e.g., a '1' indicates the inverse disrupt function is enabled for the port, while a '0' indicates the inverse disrupt function is disabled for the port. With latch 114, the inverse disrupt control circuit 108 is enabled on a port-by-port basis.

Figure 7:
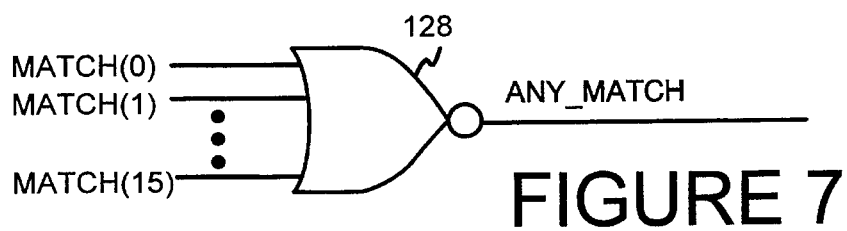
FIG. 7 is a more detailed diagram of a circuit used to produce a signal ANY_MATCH in accordance with one aspect of the present invention.

The signal ANY_MATCH results from a combination of the MATCH signals for each port through a NOR gate 128 as shown in FIG. 7. If any of the addresses in a CAM 102 match the destination address in the packet and the corresponding enable line, i.e., latches 110 or 112, for the port is set high, a high bit results for the port in the MATCH signal. The combination of the MATCH signals in NOR gate 128 results in a high bit output from NOR gate 128 only if there is no match of valid addresses, i.e., the MATCH signal for each port is low. If any of the ports do have a match of a valid address, the ANY_MATCH signal is low.

The output signal DISRUPT for a port is thus determined by the PASS signal, the MATCH signal, and the ANY_MATCH/port enablement bit combination result (FIG. 6) in one embodiment of the present invention. While PASS is low, a high bit in the MATCH signal raises the DISRUPT signal high. The DISRUPT signal is transmitted to MUX 109 (FIG. 5). A high DISRUPT signal results in unmodified or undisrupted data being transmitted to the port. A low DISRUPT signal results in modified data being transmitted to the port. As mentioned above, the modified data is preferably random pseudo-data transmitted instead of the data in the data packet.

Thus, as shown, if there is no match for any port, the DISRUPT signal is high by way of the ANY_MATCH signal and the data is undisrupted on the port transmitting data to a second repeater or coax. Disrupting a packet on such a port when there is a match is the inverse of a typical disruption circuit. Most circuits disrupt a packet on this type of port when there is no match between the addresses, thus requiring large storage capabilities to store addresses that may cause a match for networks with multiple end station addresses. The circuit arrangement of the present invention, however, does not require the storage of all of the possible plurality of addresses associated with remote repeaters.

Furthermore, with the present invention, the ports on a repeater that are not connected with another repeater or coax operate in a manner more similar to the typical manner with a low DISRUPT signal indicating there is no match for the port and therefore transmitting modified data to the port.

In a multicast situation in which a data packet is destined for more than one end station address on more than one port, the present invention provides a suitable secure transmission circuit. With the reduced storage requirements for individual port addresses within a repeater, the CAM 102 can store specific multicast addresses and assign the multicast address to specific ports on the network, as is well understood by those skilled in the art. The matching circuit of the present invention suitably controls the proper disruption or nondisruption of a multicast packet at the ports.

By way of example, if a particular set of end stations on a network belong in a single workgroup an occasional data packet may contain information intended for more than one end station in the workgroup. A particular multicast address can be stored and associated with the proper ports in the CAM 102 to provide specific addressing for multicast packets. Basic memory storage routines can be used to store the addresses with the ports as will appreciated by those skilled in the art. The storage space of the CAM 102 determines the amount of specific multicast addressing available and is dependent on the particular needs of a design. In this way, the repeater has greater flexibility while still providing a secure environment.

Figure 8:
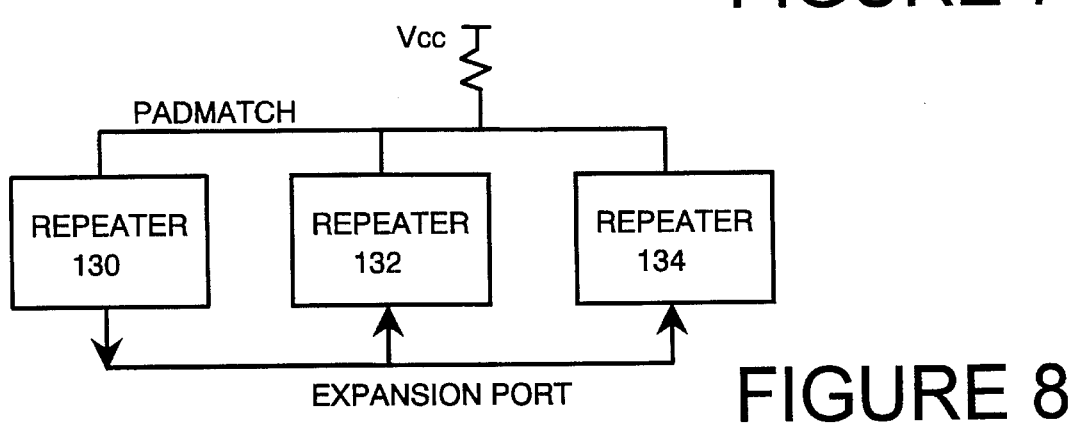
FIG. 8 is block diagram of a multi-repeater circuit in accordance with one aspect of the present invention.

Greater flexibility is also provided by the inverse disrupt control circuit 108 in the present invention with the output of the PADMATCH signal on the expansion bus (FIG. 8). The inclusion of the PADMATCH signal on the expansion bus allows multiple repeater chips to be linked together and communicate the status of the comparison of the destination address with the stored end station addresses for each CAM in each repeater chip. In this way, the inverse disrupt control circuit 108 is scalable for networks having multiple repeater chips, as FIGS. 8 and 9 illustrate.

FIG. 8 presents a block diagram of multiple repeater chips with repeater 130 passing a data packet to repeater chips 132 and 134. The details of passing a packet among repeater chips is typically understood by those skilled in the art and will not be included in detail in the present discussion. A description of this is described in U.S. Pat. No. 5,265,123 entitled "Expandable Repeater". The repeater chips 130, 132, and 134 each receive the destination address, shift the destination address into a shift register, and perform a comparison on the end station addresses stored in their respective CAM units as described above. The subsequent control of the inverse disrupt circuit 108 operates as described above with the following exceptions. The circuit producing the ANY_MATCH signal as shown in FIG. 7 is modified as shown in FIG. 9.

Figure 9:
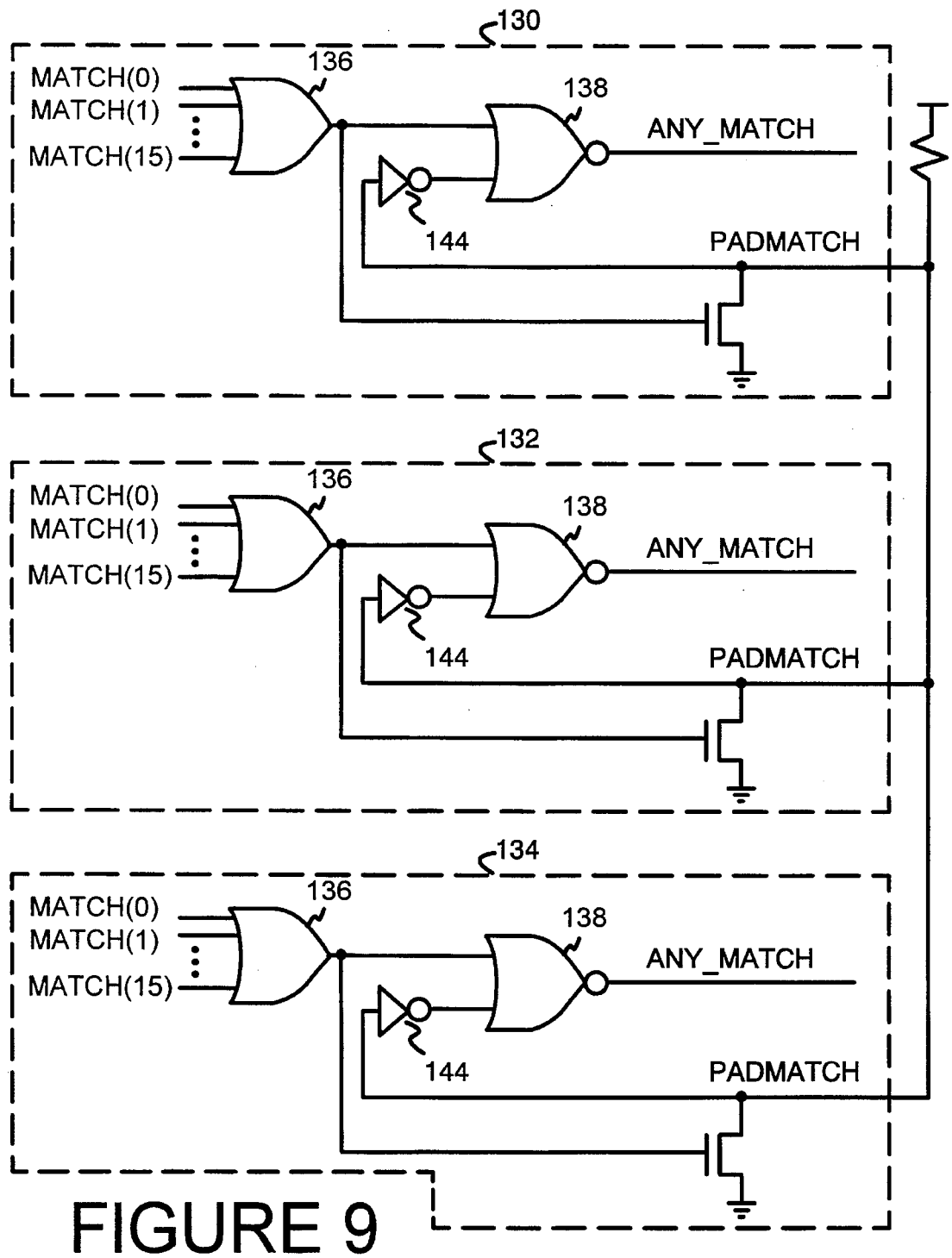
FIG. 9 is a more detailed diagram of a circuit used to produce a signal PADMATCH with the multi-repeater circuit of FIG. 8.

FIG. 9 shows the circuit for producing the ANY_MATCH and PADMATCH signals. The MATCH signals for each port are input into OR gate 136 and the output from OR gate 136 is input to NOR gate 138. The output from OR gate 136 is also coupled to the gate of transistor 140, suitably an n-channel MOSFET. The PADMATCH signal is an open drain signal ored externally and pulled high with a resistor 142 connected to a power supply. The source is connected to ground. The drain is further coupled to the input of an invertor 144. The output of invertor 144 is coupled to the NOR gate 138. The NOR gate 138 outputs the signal ANY_MATCH for propagation through the inverse disrupt circuit 108 (FIG. 6).

With the circuit arrangement as shown in FIG. 9, a valid match on a repeater chip pulls the PADMATCH pin low. The low signal on the PADMATCH pin is sensed by all of the repeater chips, e.g., repeaters 130, 132, and 134, and inverted through invertor 144. The ANY_MATCH signal is the combination of the ORed MATCH signals and the inverted PADMATCH signal. When the ORed MATCH signals result in a high output from OR gate 136, the PADMATCH signal is brought low for all the repeater chips. The ANY_MATCH signal is low so that the DISRUPT signal is low, i.e., the packet is disrupted, for all ports except the port having the MATCH signal high. If no match occurs within a single repeater chip, the ANY_MATCH signal is high while the PADMATCH signal is high. Once a match occurs in one repeater chip, e.g. repeater chip 130, the other repeater chips, e.g., 132 and 134, are aware of the match by the PADMATCH signal dropping low. This in turn drops the ANY_MATCH signal low in the repeater chip, i.e., repeater chip 130, having the match. Preferably, the operation of the inverse disrupt control circuits 108 for each repeater chip operate substantially simultaneously.

The ability to provide a signal among multiple repeater chips to indicate the status of the address comparison within each repeater creates a scalable network disruption circuit. Further, the storage space of a multiple repeater chip system thus appears to have one large storage unit approximately equivalent in size to the combination of the CAMs of the repeater chips, thus increasing storage size across all of the repeater chips without creating a significant cost increase.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

What is claimed is:

1. A method for providing a secure local area network (LAN), the LAN including: a plurality of end stations, each end station including an end station address; and at least one repeater, the at least one repeater coupled to the plurality of end stations, the at least one repeater including a plurality of ports, each of the plurality of ports including an associated stored end station address, the method comprising:

receiving a data packet on the at least one repeater, the data packet including a destination address;

comparing the destination address to each of the stored end station addresses of the plurality of ports substantially simultaneously on each repeater chip in the at least one repeater; and disrupting the data packet on the plurality of ports other than at least one port of the plurality of ports when there is a match between the destination address and the associated stored end station address of the at least one port.

2. A method as recited in claim 1 wherein the step of disrupting is enabled individually for each port of the at least one repeater.

3. A method as recited in claim 1 further comprising producing a signal indicative of the results of the substantially simultaneous comparison to control the disrupting in each of the repeater chips.

4. A method for providing a secure local area network (LAN), the LAN including: a plurality of end stations, each end station including an end station address; and at least one repeater coupled to the plurality of end stations and including a plurality of ports, each of the plurality of ports including an associated end station address stored in the at least one repeater, the method comprising:

receiving a data packet on a first repeater, the data packet including a destination address;

comparing substantially simultaneously on a plurality of repeater chips in the first repeater the destination address to each of the associated end station addresses of the plurality of ports stored in the first repeater; and disrupting the data packet on one of the plurality of ports of the first repeater linked to one of the plurality of ports on a second repeater when there is a match between the destination address and the associated end station address of a port on the first repeater.

5. A method as recited in claim 4 further comprising disrupting the data packet at the plurality of ports of the first repeater other than the port having the associated end station address that matches the destination address.

6. A method as recited in claim 4 further comprising the step of producing a signal indicative of a match in any one of the plurality of repeater chips as determined by the substantially simultaneous comparison.

7. A method as recited in claim 6 wherein the signal produced controls the step of disrupting for the plurality of repeater chips.

8. A method as recited in claim 4 further comprising transmitting the data packet on one of the plurality of ports of the at least one repeater linked to one of the plurality of ports on a coaxial cable when there is no match between the destination address and the associated end station address of a port on the at least one repeater.

9. The method of claim 8 further comprising the step of disrupting the data packet on the remaining ports of the plurality of ports of the at least one repeater not linked to the coaxial cable when there is no match on the at least one repeater.

10. A system for providing a secure local area network (LAN), the LAN including a plurality of end stations, each end station including an end station address, and at least one repeater, the at least one repeater coupled to the plurality of end stations, the at least one repeater including a plurality of ports, each of the plurality of ports including an associated stored end station address, the system comprising:

a controller means for outputting control signals;

a memory comparator means coupled to the controller means for storing each of the end station addresses and comparing a destination address of a data packet to each of the stored end station addresses; and an inverse disrupt control means coupled to the controller means and the memory comparator means producing a disrupt control signal to disrupt the data packet on the plurality of ports other than one port of the plurality of ports when there is a match between the destination address and the associated stored end station address of the one port and further producing a signal indicative of a match among a plurality of repeater chips in the at least one repeater.

11. A system as recited in claim 10 wherein the inverse disrupt control means is enabled individually for each of the plurality of ports of the at least one repeater.

12. A system as recited in claim 10 wherein the end station address is a multicast address.

13. A system as recited in claim 10 wherein the end station address is a non-multicast address.

14. A system as recited in claim 10 wherein the signal produced interlinks the plurality of repeater chips to control the disruption of the data packet substantially simultaneously on all of the ports of the plurality of repeater chips other than the one port having the match.

* * * * *